(No Model.)

P. W. CASSIL.
SCREW.

No. 603,891. Patented May 10, 1898.

WITNESSES:
Donn Turtchell
Chas. R. Wright

INVENTOR
P. W. Cassil.
BY Munn & Co
ATTORNEYS.

UNITED STATES PATENT OFFICE.

PHILIP W. CASSIL, OF GARNER, IOWA.

SCREW.

SPECIFICATION forming part of Letters Patent No. 603,891, dated May 10, 1898.

Application filed September 7, 1897. Serial No. 650,824. (No model.)

*To all whom it may concern:*

Be it known that I, PHILIP W. CASSIL, of Garner, in the county of Hancock and State of Iowa, have invented a new and Improved Screw, of which the following is a full, clear, and exact description.

My invention relates to screws having their plain or unthreaded portions bent or curved to adapt them to serve as hooks; and it has for its object to provide a screw of the character indicated which can be conveniently screwed straight into an object by the ordinary screw-driver.

The invention consists in providing the head of the screw with a slot the bottom of which is at an angle to the face of the head and perpendicular to the longitudinal axis of the body of the screw.

The invention also consists in the particular construction and arrangement of parts, as hereinafter fully described, and pointed out in the claims.

Reference is to be had to the accompanying drawings, forming a part of this specification, in which similar letters of reference indicate corresponding parts in all the figures.

Figure 1:
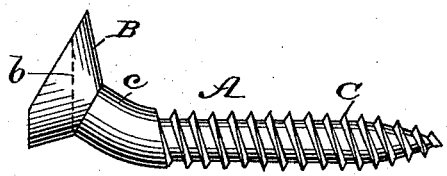
Figure 2:
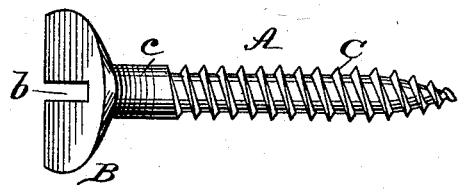
Figure 3:
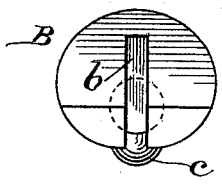
Figure 4:
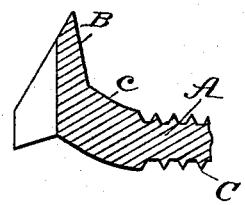

Figure 1 is a side elevation of the improvement. Fig. 2 is a plan view. Fig. 3 is an end view, and Fig. 4 is a longitudinal section of a portion of the screw.

In the drawings the screw A is provided with the usual threaded shank portion C, which terminates in the unthreaded or smooth portion c, next to the head B. The portion c of the shank is bent or curved upwardly, as shown, so as to form with the head B a hook.

The head B instead of being formed with the usual slot extending entirely across the face of the head and of uniform depth throughout is provided with the slot b, which extends partially across the face of the head and is of varying depth.

As shown in the drawings, the slot terminates at one end short of one edge of the head and has its other end extending through the opposite edge of the head and into the plain shank portion c of the screw. By thus constructing the slot the bottom thereof will be at an angle to the face of the head and perpendicular to the longitudinal axis of the screw, thereby permitting the screw to be screwed straight by means of the ordinary screw-driver.

A screw constructed as above while adapted for various purposes is especially adapted for securing weather-strips to doors or the like.

Having thus described my invention, what I claim, and desire to secure by Letters Patent, is—

1. As a new article of manufacture, a screw having its plain or unthreaded portion bent or curved and provided in its head with a slot, the bottom of which is at an angle to the face of the head, and perpendicular to the longitudinal axis of the body of the screw, as set forth.

2. As a new article of manufacture, a screw having the end of its shank next to its head bent or curved, and provided in its head with a transverse slot, tapering gradually from one end to the other, and having one end extending into the bent or curved shank, as and for the purpose set forth.

3. As a new article of manufacture, a screw having its plain or unthreaded portion bent or curved and provided in its head with a slot extending partially across the same, the bottom of the said slot being at an angle to the face of the head and perpendicular to the longitudinal axis of the body of the screw, as set forth.

PHILIP W. CASSIL.

Witnesses:
M. R. CHAMBERS,
S. S. WILLIAMSON.